United States Patent [19]

Sweeney, Jr.

[11] Patent Number: 4,922,856
[45] Date of Patent: May 8, 1990

[54] VIBRATIONALLY ACTIVATED CONTROL APPARATUS FOR DETECTING SIGNALS FROM FISH TO ENABLE DEMAND FEEDING

[75] Inventor: John W. Sweeney, Jr., Boerne, Tex.

[73] Assignee: Sweeney Enterprises, Inc., Boerne, Tex.

[21] Appl. No.: 292,659

[22] Filed: Dec. 27, 1988

Related U.S. Application Data

[63] Continuation of Ser. No. 50,728, May 15, 1987, abandoned.

[51] Int. Cl.$^5$ ............................................. A01K 61/02
[52] U.S. Cl. .............................. 119/51.04; 119/51.11; 119/54
[58] Field of Search .................... 119/29, 51.11, 51 R, 119/53.5, 54; 84/DIG. 24; 310/323

[56] References Cited

U.S. PATENT DOCUMENTS

| 3,381,525 | 5/1968 | Kartluke et al. | 310/323 X |
| 3,457,463 | 7/1969 | Balamuth | 310/323 X |
| 4,027,627 | 6/1977 | Fillion | 119/56 R |
| 4,131,815 | 12/1978 | Beatright | 310/323 |
| 4,546,658 | 10/1985 | Rocha et al. | 310/323 X |
| 4,606,300 | 8/1986 | Sterner | 119/51 R |

FOREIGN PATENT DOCUMENTS

| 2310382 | 9/1974 | Fed. Rep. of Germany | 119/51 R |
| 2241936 | 3/1976 | Fed. Rep. of Germany | 119/51 R |

Primary Examiner—Paul J. Hirsch
Attorney, Agent, or Firm—Cox & Smith Incorporated

[57] ABSTRACT

An apparatus for receiving signals in the form of strikes from fish to control the operation of a scatter-type feeder to feed the fish in response to the fish strikes. The apparatus transforms vibrations of strikes by even the tiniest of fish into electrical signals which may be amplified and analyzed by control circuitry to control the operation of the scatter-type feeder. In operation, the circuitry effectively controls the amount of feed dispensed per batch by the feeder, causes a delay time (a pause) to follow after the dispensation of one batch before it is possible for strike signals to initiate the dispensation of a second batch and requires the strike to be one of a specified magnitude before food is dispensed. Each of these controls is adjustable by knobs on a control box.

16 Claims, 2 Drawing Sheets

VIBRATIONALLY ACTIVATED CONTROL APPARATUS FOR DETECTING SIGNALS FROM FISH TO ENABLE DEMAND FEEDING

This application is a continuation of co-pending application Ser. No. 050,728, filed May 15, 1987 now abandoned.

BACKGROUND OF THE INVENTION

The present invention relates to an apparatus for enabling demand feeding of fish. More particularly, the present invention is directed to provide an electronic apparatus for enabling feeding of fish upon sensing signals from the fish whose sizes vary and include the smallest of fish Electrical characteristics of the apparatus enable adaptability of the apparatus for use in controlling any of a variety of electrically actuated feed dispensers for dispensing feed having any desired moisture content or granular size. Controls are provided for controlling other aspects of the feeding process including the sensitivity of the apparatus to the strike of a fish, the quantity of feed dispensed per operative signal, and the minimum temporal delay between signals which can be operative.

Although the fish industry itself has ancient origins, farming of fish is a relatively new aspect of the industry and has experienced rapid growth in recent years. Extensive fish farms and fish hatcheries have, thus, become popular, and means for enabling feeding in such facilities is essential. Research facilities are also becoming commonplace in the fish industry, and feeding means with sensitive and accurate controls of varied natures are useful in such research facilities.

Whether the facility is for research purposes or for basic farming purposes, it is advantageous for the feeding means which is employed to enable optimization of the feeding process. Controlling the amount of feed which is dispensed is crucial to maximize the growth rate of the fish while minimizing the amount of wasted food which is caused by excessive feeding. Enabling variation in the types of feed which are dispensable, is also advantageous, particularly in the situation where smaller and finer feed is necessary for feeding younger or smaller sized fish. Dispersion of the dispensed feed is also advantageous, not only to enable greater access by more fish since dispersed feed is spread over a larger area, but also to protect the marketability of the fish since bruising and other damage can result from concentrated feeding.

While care of young fish can be advantageous to production of older, more marketable fish, the care of young fish, in both research facilities as well as farming facilities, is of particular concern and need. In the past, feeding of such fish has virtually always been achieved by hand or by feeding apparatus which are actuated by timers. As will be seen, such apparatus have disadvantages, and it is an object of the present invention to be more advantageous than the previous methods and apparatus.

Probably the simplest of means for feeding fish in a farm or hatchery is to scatter the feed into the waterways (raceways), of the farm using one's hands, a coffee can, or similar means to scatter the feed in a manner similar to the traditional feeding of pigeons in a park. Although such feeding may be economical due to the minimum cost of the dispensing means, the control is often guess-work and inaccurate and such feeding operation can require extensive, sometimes almost continuous, man hours, particularly with larger sized farms.

Demand feeding (also known as response feeding) has become a very popular means for feeding fish in a farm. Demand feeders, by definition, dispense feed upon receiving or sensing signals from the fish to be fed. Virtually all demand feeders are simple in design, economical, and fairly trouble free; however, demand feeders have severe limitations. Conventional demand feeders comprise a rigid container with a funnel-shaped aperture through which feed is influenced by the force of gravity. A pendulum is suspended from above the funnel-shaped aperture and is positioned to descend through the aperture The pendulum and the aperture are designed to obstruct the flow of the feed through the funnel-shaped aperture except when the pendulum is struck by a fish in the water below; this striking by the fish both agitates the feed to stimulate its dispensation by gravity and also enables the dispensation by varying the size and shape of the space through which the feed may be dispensed. Since fish readily learn to strike the pendulum when feed is desired by the fish, the fish may effectively be fed upon demand, which demand is signaled by the striking of the fish against the pendulum. Such demand feeding is believed by many to be the optimum type of feeding from the farmer's perspective since the feed is ideally dispensed only when the fish desire to consume the feed. In this way, wasting of excessive feed is avoided while the fish may also consume the maximum amount of feed and thus sustain maximum growth rate.

However, demand feeding has several severe limitations. To begin with, the conventional demand feeder cannot be operated by tiny fish since sensing the strike of a tiny fish requires extreme sensitivity, and the strike of a tiny fish is not substantial enough to adequately agitate the feed in a conventional demand feeder. Furthermore, the feed from a conventional demand feeder is dispensed vertically downward and concentrated on a relatively small location of the raceway rather than being dispersed uniformly over a larger area. This concentrated dispensation tends to allow larger ones of different sized fish within a single tank to exclude the smaller fish from feeding since the larger fish can fend off the smaller ones. Concentrated feeding also tends to cause damage to the feeding fish since the fish are in close contact with each other and bruising often occurs.

Electronic means to scatter the feed, such as the conventional deer feeder, are useful in alleviating the problem of concentrated feed dispensation; however, such scattering means for feeding fish have heretofore only been operable by preset timers which, accordingly, circumvent the advantages of demand feeders.

Furthermore, conventional demand feeders cannot dispense certain kinds of feed. Finely ground feed tends to flow directly through the aperture of a conventional demand feeder without regard to the obstruction of the pendulum. This flow-through problem with finely ground feed in conventional demand feeders destroys the usefulness of conventional demand feeders for finely ground feed.

Moist feeds, as well, present problems with conventional demand feeders since moist feeds tend to clog in the funnel-shaped aperture. Scatter-type dispensing means minimize these problems with both finely ground feed as well as the moist feeds; however, as previously mentioned, there have been no means utilized in the past for operating a scatter-type feeder on a demand basis.

The timers necessary for operation of the scatter-type feeders in the past have also presented economical considerations since typical timers tend to be relatively expensive, and, therefore, substantially increase the cost of a fish-feeding operation.

Therefore, it is a primary object of the present invention to provide a means for enabling demand feeding of tiny fish. Inclusive in this primary object is another object to provide an extremely sensitive means for sensing the strike of a tiny fish and coordinating this sensing with means to actuate the dispensation of the desired feed. Further, it is an object of the present invention to enable dispensation of feeds of varied compositions, granular fineness, and moistness; dispensation of such feeds in a scattered manner is another object of the present invention. It is yet another object of the present invention to provide means for controlling the duration, quantity, and frequency of the dispensed feed, and further to effectuate such control in conjunction with a demand feeder. Overall, it is an object of the present invention to enable optimization of the feeding of fish, particularly, the feeding of tiny fish in hatcheries, research facilities, and fish farms, while also maximizing the economic factors of the operation of such means.

These and other objects, features and advantages of the present invention will become evident to those skilled in the art in light of the following detailed description, viewed in conjunction with the referenced drawings, of a preferred exemplary system according to the invention. The foregoing and following descriptions of the invention are for exemplary purposes only. The true spirit of the invention is set forth in the appended claims.

SUMMARY OF THE INVENTION

The apparatus of the present invention comprises a unique means for sensing the strike of a tiny fish which incorporates a piezoelectric cartridge which is capable of sensing the most minute of vibrations. In operation, even when a tiny fish strikes the rod of the present invention, the piezoelectric cartridge may sense the strike and transmit an electrical signal to a control circuitry, which circuitry controls the operation of a scatter-type fish feeder apparatus in response to signals received from the piezoelectric cartridge.

A fundamental aspect of the present invention is the provision of the piezoelectric cartridge for transforming the mechanical demand signal of a fish strike into an electrical signal for use in determining the control of a scatter-type feeder. By enabling the implementation of a scatter-type feeder on a demand feeding basis, fish farmers and researchers can reap many benefits of demand feeding while also incorporating the benefits of a scatter-type feeder. Note also that any type of powered dispensing means may be utilized in conjunction with the present invention. Problems associated with conventional demand feeders such as wastage of feed, bruising of fish and greater consumption of feed by the dominant fish in a raceway can, thus, be eliminated.

Additionally, the incorporation of electrical amplifiers in conjunction with the piezoelectric cartridge and other aspects of the present invention enables the detection of strike signals from the tiniest of fish. The piezoelectric cartridge detects vibrations and provides an electrical signal proportional to the magnitude of the vibration. Its function is similar to the function of a conventional phonographic needle cartridge which transmits electrical signals upon sensing vibrations that are initiated by the phonograph record. This provides a means for enabling demand feeding of tiny or newborn fish in most situations where demand feeding was previously unavailable. While sensitivity adjustment knobs may provide for adjustment of the control of the feeder in order to respond to signals of tiny fish without responding to extraneous vibrations, they may also adjust the control in order to respond to signals of larger fish without unnecessarily responding to extraneous vibrations such as waves which accompany larger fish.

The control mechanism for the present invention comprises electrical circuitry which is adjustable to achieve various feeding characteristics. This electronic circuitry includes means for adjusting sensitivity in order to employ the apparatus in environments with either large or tiny fish that will be striking the rod. This sensitivity adjustment also enables adjustment of the apparatus to avoid responding to false signals such as those due to waves or other extraneous forces. Upon receiving a valid signal as determined by the circuitry and sensitivity adjustments, the control box causes an adjoined feeder to dispense a batch of feed. Other adjustment means controls the quantity of feed dispensed in a batch. This means is embodied as an adjustable timer mechanism which regulates the quantity of feed dispensed by setting the duration which the dispensing means operates for each operative signal from the fish. The electronic circuitry further includes means for providing a minimum delay between batches; thus, the frequency of batches may be limited in order to preclude unnecessary and wasteful dispensation of feed when another batch is likely to still be present in the raceway. Means may also be incorporated to provide a delay, not in time, but a delay which requires a specified plurality of strikes rather than a single strike in order to restrict pure demand feeding.

Furthermore, while many hatcheries or fish farms are exposed to an outdoor environment, the apparatus of the present invention must, ideally, withstand variations in temperature without affecting performance Such reliability despite temperature variations is achieved through incorporation of the piezoelectric cartridge whose responsive electric signal is virtually independent of the environmental temperature; whereas, other less inventive means such as determining the resistance variations similar to determinations by conventional strain gauges, are affected by temperature.

Furthermore, in addition to enabling optimum feeding of fish of all sizes, which optimum naturally maximizes economic benefits, the present invention utilizes circuitry and means (such as an inexpensive piezoelectric crystal) which enabled the typical cost of the present invention to be competitive with the typical cost of other inventions of the same field, particularly as compared to means for feeding fish which are regulated by timers.

Nonetheless, additional advantages, aspects and objects of the present invention will become apparent to one of ordinary skill in the art from the following descriptions of the preferred embodiments as well as from the appended claims of the present invention.

DETAILED DESCRIPTION OF THE PREFERRED EMBODIMENT

Figure 1:
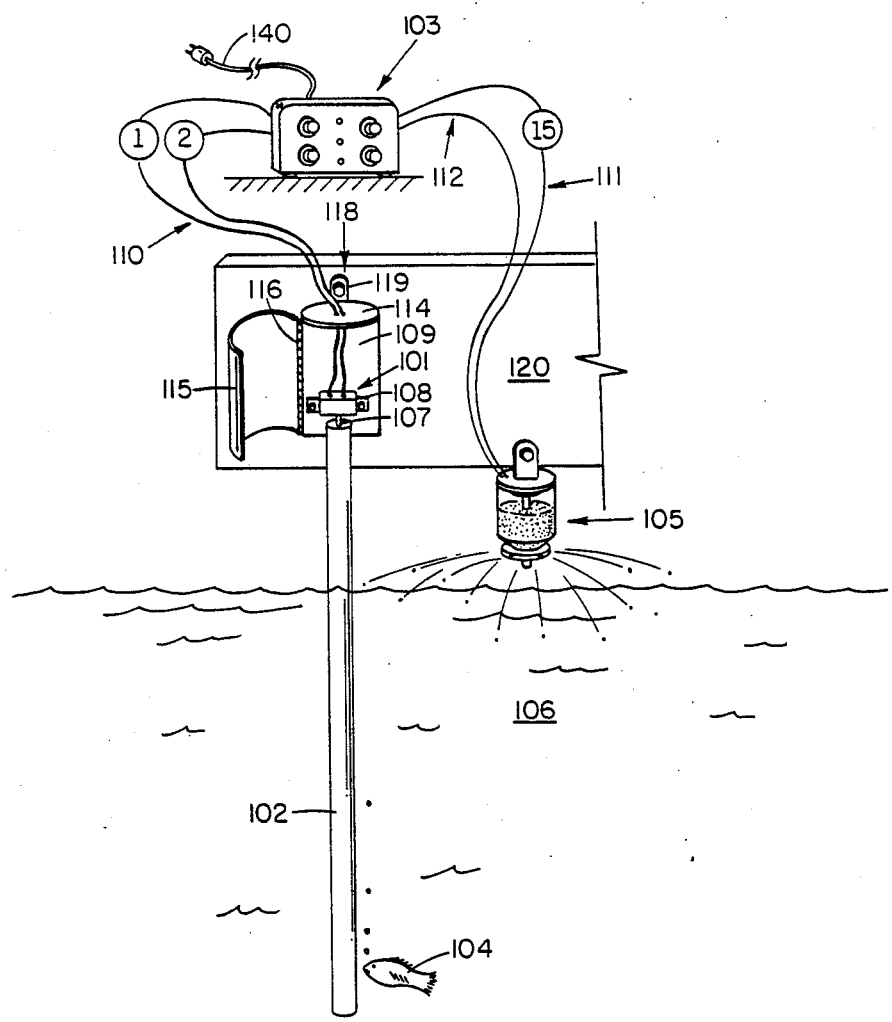
FIG. 1 is a front perspective view of the invention in a system employed in a typical environment for use of the invention.

Referring to FIG. 1, there is shown the apparatus of the present invention employed in a complete system for effecting the feeding of fish 104 within raceway 106. The means for sensing the signals from fish 104, comprises rod 102, which rod 102 is composed of a material such as lucite which is appropriate for conducting vibrations, is rigidly connected to piezoelectric cartridge 101 for enabling the sensing of vibrations that are conducted by rod 102. Piezoelectric cartridge 101 includes a piezoelectric crystal (not shown) integrally formed with the casing of the cartridge 101. The casing of cartridge 101 is composed of an electrically insulated material and is provided with a piezoelectric crystal enclosed within the casing of cartridge 101. Cartridge 101 is also provided with a sensitive means, lever 107, for receiving vibrations from lucite rod 102 and for conveying these received vibrations to the piezoelectric crystal of cartridge 101. The rigid connection between rod 102 and cartridge 101 is at a first end of lever 107, which first end is external to the casing of cartridge 101. The second end of lever 107 is rigidly connected to piezoelectric crystal of cartridge 101 in a manner which conveys pressure onto the piezoelectric crystal of cartridge 101 when vibrations are conducted through lever 107. Electrically electrical leads 110 are operatively connected to the piezoelectric crystal of cartridge 101 for conducting electrical signals from the piezoelectric crystal of cartridge 101, which electrical signals are characteristic responses of piezoelectric crystals when subjected to physical pressures. The ends of electrical leads 110 which are connected to piezoelectric crystal of cartridge 101 protrude into and are integrally formed with the casing of cartridge 101. Protective enclosure 109 is a means for partially encapsulating cartridge 101 to protect cartridge 101 from the environment. Door 115 of enclosure 109 hinges to the bulk of protective enclosure 109 with hinges 116, which hinges 116 are operatively positioned and connected between door 115 and the bulk of enclosure 109. Door 115 is shown in an open position in FIG. 1. With door 115 operatively closed with respect to protective enclosure 109, protective enclosure 109 takes the shape of a cylindrical enclosure whose axis is positioned vertically and which enclosure is provided with a lid 114 at the top longitudinal end of the cylindrical shape. The lower longitudinal end of the cylindrical enclosure of enclosure 109 has an opening for enabling dependence of rod 102 beneath enclosure 109. Cartridge 101 is rigidly connected to the bulk of enclosure 109, which rigid connection is enabled by bracket 108 that is rigidly connected to both cartridge 101 and the bulk of enclosure 109. Tab 119 is integrally formed with enclosure 109, and tab 119 is provided with a hole 118 through tab 119 for enabling the rigid mounting of enclosure 109 to an appropriate support 120. Support 120 and the connection of enclosure 109 to support 120 are positioned to allow rod 102 to protrude from enclosure 109 into the raceway 106.

Feeder 105 is an electrically actuated scatter-type feed dispenser which can be employed to care for animals by feeding such animals. Feeder 105 can be of a type for feeding domestic animals, including fish 104, or of a type for feeding any other animals, which other animals are termed "wild animals". Most beneficially, while the present invention is primarily directed to feeding of tiny fish, feeder 105 has characteristics which conventionally enable scattering of finely ground feed when and only when electrical power is provided for feeder 105. Electrically conductive leads 111 and 112 are operatively connected to feeder 105 for enabling the transmission of electrical power from control box 103 to feeder 105, which electrical power enables operation of feeder 105. Lead 111 is connected to post 15 for enabling electrical communication between post 15 and feeder 105, which electrical communication empowers feeder 105. Lead 112 enables the completion of an electric circuit that provides power to feeder 105. For a particular feeder 105 which utilizes direct current voltage for operation, lead 112 is connected to control box 103 in a manner that enables electrical communication between lead 112 and the common electrical ground of control box 103. For feeder 105 which requires alternating current power, lead 112 is connected to control box 103 in a manner that enables the completion of the alternating current circuit which provides power to feeder 105 when control box 103 is operatively triggered for such empowering of feeder 105. Feeder 105 is rigidly connected to support 120 and is positioned above raceway 106 for enabling optimum dispensation of feed to fish 104. Leads 110 are connected to control box 103 for enabling electrical communication between the piezoelectric crystal of cartridge 101 and posts 1 and 2, which electrical communication provides a negative electrical signal to post 1 when the piezoelectric crystal of cartridge 101 is subjected to pressure. Posts 1, 2 and 15 shown in FIG. 1 correspond to similarly numbered posts in FIG. 3 for cross-reference between the drawings.

Thus, in operation when properly employed in relation to raceway 106 with fish 104, piezoelectric cartridge 101 will transmit an electrical signal through electrical leads 110 to control box 103 when a fish 104 strikes rod 102. Control box 103 controls the operation of feeder 105 in response to the electrical signals received through leads 110. Although the control by control box 103 is also determined by a plurality of adjustments on control box 103, feeder 105 is operated to dispense feed in response to strikes by fish 104 on rod 102. As the prior art and other experiments by the Applicant have indicated, fish 104 can learn to demand feed by striking rod 102. Since piezoelectric cartridge 101 is sensitive even to minute vibrations from rod 102, the tiniest of fish can be fed on a demand basis when the present invention is employed for that purpose.

Another embodiment (not shown) of the present invention incorporates a means similar to an audiophonic microphone for sensing the minute vibrations and correspondingly transmitting electrical signals to control box 103. Thus, cartridge 101 may be replaced by an equivalently positioned and employed microphone.

Figure 3:
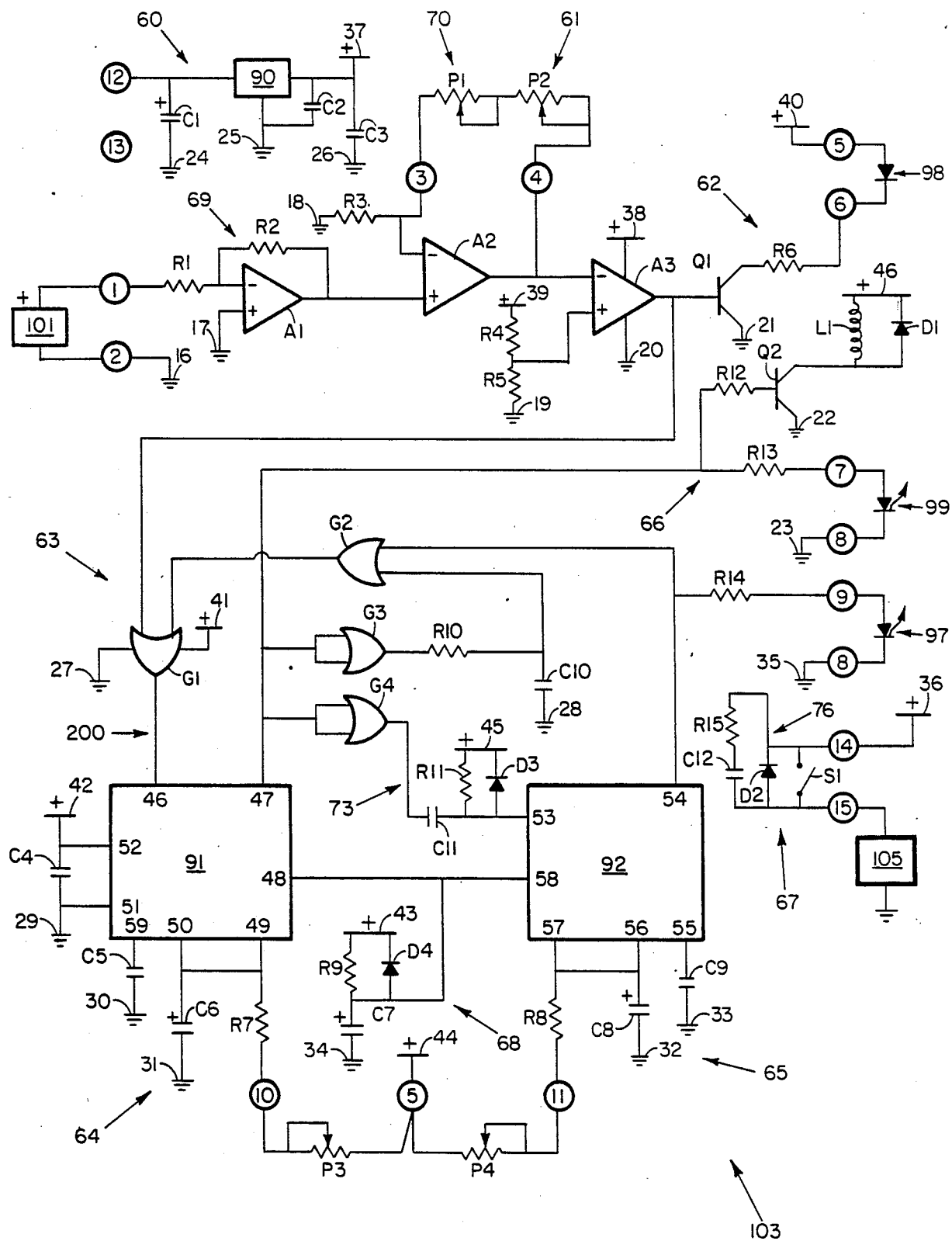
FIG. 3 is a schematic representation of the electrical circuitry of the present invention.

Referring now to FIG. 3, the electronic circuitry of control box 103 is schematically pictured. For the purposes of the description of the electrical operation of the circuitry of the present invention, the phrase "transmitted directly to...", referring to an electric signal being transmitted from a first specified electric component to another specified electric component, shall mean that the signal is transmitted (i.e. electrically conducted) through electrically conducting means which maintains the voltage of the transmitted signal between the first and the other electric component.

Ground leads 16 through 35 are operatively connected to enable electrical communication from their respective positions within the circuitry of control box 103 to an appropriate electrical ground. Voltage supply leads 38 through 46 are each operatively connected to voltage supply lead 37 of voltage supply 60 for enabling supply of electricity to each of voltage supply leads 38 through 46, which connection enables respectively equivalent electrical potential (i.e. voltage) at each of voltage supply leads 38 through 46.

Electrical component 90 is a conventional voltage regulator, such as voltage regulator LM 7805 produced by National Semiconductor for regulating the voltage supplied to lead 37 in an appropriate range for the circuit board Timers 91 and 92 are conventional timers which are physically embodied as a dual timer functionally similar to a dual timer such as National Semiconductor's LM556 with posts 50 and 56 being discharge posts, posts 49 and 57 being threshold posts, posts 48 and 58 being reset posts, posts 47 and 54 being output posts, posts 46 and 53 being trigger posts, posts 55 and 59 being control voltage posts, post 52 being the circuit voltage ($V_{cc}$) post and post 51 being the ground post, each of said posts 50 through 59 respectively corresponding to the similarly termed posts of timer LM556 produced by National Semiconductor.

Referring again to FIG. 3, the circuitry of the present invention basically comprises a plurality of sub-circuits 60 through 68 for enabling a plurality of respectively independent electrical functions. As will be further described, each of said sub-circuits 60 through 68 includes a plurality of electrical components for enabling the respective functions of each sub-circuit 60 through 68. Each of sub-circuits 60 through 68 also includes means for connecting the components of each sub-circuit 60 through 68 to each other of those components for enabling the respective function of the corresponding sub-circuit. These functions enabling connections provide means for enabling electrical communication between the components as indicated by FIG. 3. For instance, FIG. 3 indicates that an electrically communicating and function enabling connecting means 200 (i.e. electrical connection 200) is connected to enable direct electrical communication between logic gate G1 and post 46 of timer 91. The basic sub-circuits are voltage supply 60, operational amplifier 61, strike indicator 62, logic control circuitry 63, feed timer circuitry 64, delay timer circuitry 65, feeder actuator and indicator circuitry 66, feeder relay filter circuitry 67, and reset circuitry 68. Direct electrical connections (e.g. electrical connection 200) are also operatively connected between each electrically adjacent sub-circuit 60 through 68 and others of sub-circuits 60 through 68 for enabling direct electrical communication between sub-circuits 60 through 68 according to the schematically represented connections of FIG. 3.

Voltage supply 60 includes capacitors C1, C2 and C3 as well as voltage regulator 90. Voltage supply 60 is operatively connectable to an appropriate DC power supply (not shown) between probes 12 and 13. Once connected to the DC power supply, voltage supply 60 is operative for supplying the electronic circuitry of control box 103 with a constant voltage ($V_{cc}$). Operational amplifier 61 includes resistors R1 through R5, comparators A1 through A3, and potentiometers P1 and P2 operatively connected as indicated in FIG. 3. Wiring from posts 1 and 2 are operatively connected in electrical communication with piezoelectric cartridge 101 for receiving and conducting an electrical signal from the piezoelectric crystal within piezoelectric cartridge 101 when piezoelectric cartridge 101 is operatively stimulated. Strike indicator 62 includes pnp transistor Q1, resistor R6, and LED indicator 98, operatively connected for enabling electrical communication as schematically indicated in FIG. 3. Logic control circuitry 63 includes OR gates G1 through G4, resistors R10, R11, and R14, capacitors C10 and C11, diode D3, and LED indicator 97. Logic control circuitry 63 is in direct electrical communication with comparator A3, transistor Q1, feeder actuator and indicator 66, posts 46 and 47 of timer 91, posts 53 and 54 of timer 92, as well as voltage supply 60.

Feed timer circuitry 64 includes feed timer 91, capacitors C4 through C6, resistor R7, and potentiometer P3. Delay timer circuitry 65 includes delay timer 92, capacitors C8 and C9, resistor R8 and potentiometer P4. Reset circuitry 68 includes resistor R9, diode D4, and capacitor C7. Feeder actuator and indicator circuitry includes resistors R12 and R13, npn transistor Q2, coil L1, and diode D1. Feeder relay and filter circuit 67 includes relay S1, resistor R15, capacitor C12 and diode D2. Means (not shown) for controlling relay S1 is operatively connected to relay S1 and is operatively positioned with respect to coil L1 for closing and opening relay S1 according to the electrical signals conducted through coil L1. More specifically, relay S1 is closed by coil L1 when activation of transistor Q2 enables the flow of electricity through coil L1, and relay S1 is open when transistor Q2 is not activated.

In operation when piezoelectric crystal 101 senses a vibrational signal from a fish 104, piezoelectric cartridge 101 transmits an electrical signal to post 1 and, successively, to operational amplifier 61 which amplifies the voltage of the electrical signal from piezoelectric cartridge 101. Comparator A1 and resistors R1 and R2 interrelationally function as a preliminary amplifier 69 for amplifying the electrical signal from piezoelectric cartridge 101. The amplified signal from preliminary amplifier 69 is further amplified by comparator A2, resistor R3, and potentiometers P1 and P2, which collectively function as an adjustable amplifier 70 for amplifying the electrical signal. Potentiometers P1 and P2 are means for enabling this adjustment of the amplification; potentiometer P1 is a coarse amplification adjustment and potentiometer P2 is a fine amplification adjustment. Depending on the initial magnitude of the electrical signals received at post 1 from piezoelectric cartridge 101, an operator may adjust potentiometers P1 and P2 to increase and decrease the amplification of the electrical signal received from piezoelectric cartridge 101. Comparator A3 electrically compares the electric signal which is amplified and conducted by adjustable amplifier 70 with a reference voltage produced by a voltage divider made up of resistors R4 and R5. When the output of adjustable amplifier 70 exceeds this reference voltage, the output of comparator A3 goes low to turn on transistor Q1 and indicate a strike. Since the output of comparator A3 will go low only when the amplified input signal exceeds the reference voltage, there is effectively a threshold voltage which the electrical signal from piezoelectric cartridge 101 must exceed before a strike is detected. This threshold voltage can be changed by adjusting the gain of amplifier 70 by adjusting potentiometers P1 and P2. Of course, this threshold voltage corresponds to a threshold mechanical stimulation of piezoelectric cartridge 101 which that there is a minimum force which a fish must impart to the rod 102 before the circuitry will detect a strike. This minimum force is adjustable with potentiometers P1 and P2. Transistor Q1 and the other electrical components R6 and 98 of strike indicator 62 provide means for indicating a strike by conducting the electrical signal beyond transistor Q1 to enable illumination of LED indicator 98 by this conducted signal from transistor Q1. Furthermore, the low electric signal from comparator A3 is transmitted to logic control circuitry 63 which enables the initiation of the cycle of feed timer circuitry 64 unless the feed timer 64 is disabled by the other input to OR gate 61 being high, which other input derives from the post 54 of delay timer 92. Once feed timer circuitry 64 is electrically actuated, the duration of the cycle of feed timer circuitry 64 is adjustably determined by potentiometer P3. While feed timer circuitry 64 is cycling for the duration determined by potentiometer P3, an output signal is continuously transmitted from post 47 directly to logic control circuitry 63 as well as feeder actuating circuitry 66.

Feeder actuating circuitry 66 responds to the output signal from post 47 that accompanies the duration of the cycle of feed timer circuitry 64. When transistor Q2 receives this output signal which accompanies the duration of the cycle of feed timer circuitry 64, transistor Q2 is turned on and enables current to flow through L1 and diode D1. Coil L1 is operatively positioned to close the relay S1 for actuating feeder 105 when the electrical signal from post 47 turns on transistor Q2 and energizes coil L1. Simultaneously, LED indicator 99 is activated for indicating the operation of feeder 105 when LED indicator 99 detects the output signal from post 47 which accompanies the duration of the cycle of feed timer circuitry 64. Post 14 receives electrical power from DC voltage supply 36 which is appropriate to empower feeder 105. Post 15 is connected to enable electrical communication with feeder 105 for operating feeder 105 when relay S1 is closed. Although power source 36 is shown as a DC power source, alternating current power sources may, and often are, substituted for DC power supply 36 when feeder 105 requires alternating current rather than direct current. Resistor R15, capacitor C12, and diode D2 electrically function as an electrical noise suppressor between posts 14 and 15. Thus, when coil L1 closes relay S1, feeder 105 is accordingly operated.

When the timing cycle of feed timer control circuitry 64 is complete, delay timer control circuitry 65 is immediately activated to begin the timing cycle of delay timer control circuitry 65. The duration of the timing cycle of delay timer control circuitry 65 is adjustably determined by potentiometer P4. An operator of the present invention may adjust potentiometer P4 in order to adjust the delay time. During the duration of the timing cycle of delay timer control circuitry 65, an output signal is transmitted from post 54 to OR gate G2 to disable feed timer 64 and to LED indicator 97 which detects the signal and illuminates for indicating the continuation of the delay cycle.

Logic control circuitry 63 also determines the logical relationships between the cycle of feed timer control circuitry 64 and the cycle of delay timer control circuitry 65. In operation, once the cycle of feed timer circuitry 64 is completed and the accompanying output signal from post 47 is discontinued, the delay cycle triggering portion 73 of logic control circuitry 63 immediately initiates the cycle of delay timer control circuitry 65; this delay timer triggering portion includes logic gate G4, capacitor C11, resistor R11, and diode D3. Additionally, during the cycle of delay timer 65, logic control circuitry 63 effectively disables feed timer 91 which precludes the possible reinitiation of the operation of feeder 105 until the cycle of delay timer control circuitry 65 is completed. The activation of LED indicator 99 is similarly precluded during the cycle of delay timer control circuitry 65. After the cycle of delay timer control circuitry 65 is completed, the control circuitry of the present invention is returned to the static, receptive state and signals from operational amplifier 61 indicate operational output from piezoelectric cartridge 101 may again be conducted to feed timer 91 for reinitiating the cycle of feed timer control circuitry 64 in the event of a fish strike.

Reset circuitry 68 is operational to reset timers 91 and 92 to their static, uninitiated states upon empowering the circuitry of the present invention after a period when the power to the circuitry has been off. When timers 91 and 92 are static, all circuitry is in a receptive mode. Reset circuitry 68 includes resistor R9, diode D4, and capacitor C7, connected to enable electrical communication as indicated in FIG. 3 and connected to reset posts 48 and 58 of timers 91 and 92, respectively.

Accordingly, LED indicator 98 will be illuminated whenever piezoelectric cartridge 101 transmits an electrical signal corresponding to a fish strike which electrical signal satisfied the threshold voltage requirements. Fish strikes which cause the illumination of LED indicator 98 are termed "qualified fish strikes". LED indicator 99 will be illuminated only during the cycle of feed timer control circuit 64, and LED indicator 97 will be illuminated only during the cycle of delay timer control circuit 65. LED indicators 97 through 99 enable the recordation of corresponding data for researchers or, as in an alternative embodiment (not shown), conventional means for automatically recording such data may also be incorporated.

Referring again to the embodiment of FIG. 3, feeder 105, further, will be actuated for the duration of and only during the cycle of feed timer control circuit 64. Thus, following a qualified fish strike, feeder 105 will dispense feed for a time adjustably determined by potentiometer P3, and feeder 105 will not dispense feed for a period of time, the delay time, adjustably determined by potentiometer P4 immediately subsequent to the duration, feeder time, of the cycle of the feed timer control circuit 64. After the delay time corresponding to delay time control circuit 65 has passed, the circuitry returns to the receptive mode. During the receptive mode, feeder 105 does not operate and the feeder time will only be reinitiated by feed timer circuitry 64 when a subsequent electrical signal is received from piezoelectric cartridge 101 to indicate a qualified fish strike. An electrical signal that initiates the feeder time is termed an "operative signal", and the operation of components 61 through 68 which operation determines whether a signal is an operative signal, corresponding to initiation of feeder time is termed "qualifying". In another alternative embodiment (not shown) delay timer circuitry 65 is substituted by a counter for enabling a similar delay, not in time, but a delay which requires an adjustable number of qualified fish strikes before feeder 105 may again be actuated. The operation of feeder 105 can, thus, be operated as a demand feeder in response to signals from fish 104. This operation of feeder 105 is determined by the circuitry (shown in FIG. 3) of the present invention. The circuitry of the present invention may be adjusted to define a preferred operation of feeder 105 by adjusting potentiometers P1 through P4 accordingly.

Figure 2:
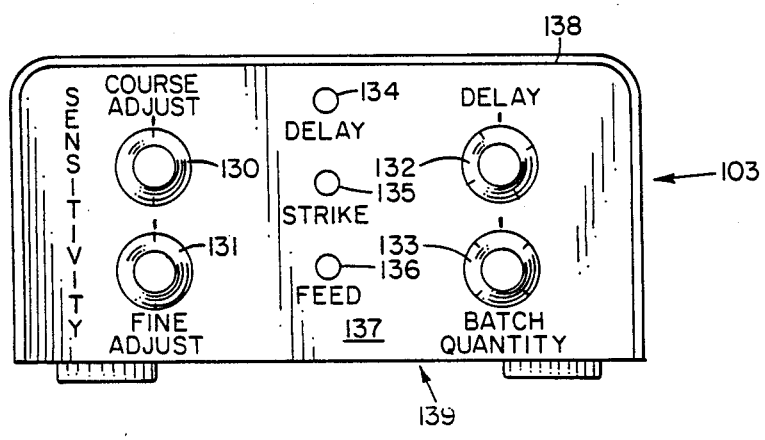
FIG. 2 is a front elevation of the control box of the present invention.

Referring to FIG. 2, the detailed elevation view of the control box 103 of the present invention is shown. Control box 103 basically comprises a container which enclosed the circuitry of the control box, a plurality of means 130 through 133 for adjusting characteristics of the circuitry, and the circuitry itself. The container of control box 103 includes U-shaped member 138, front panel 137, back panel (not shown), and lower panel 139. Panels 137 and 139, U-shaped member 138 and the back panel are rigidly connected to form a container primarily for containing, supporting and protecting the circuitry of control box 103. Front panel 137 is provided with holes 134 through 136 for enabling visibility of LED indicators 97 through 99, respectively, by an operator of control box 103. LED indicators 97 through 99 are, accordingly, positioned within control box 103 at a position immediately adjacent to holes 134 through 136, respectively.

Knobs 130 through 133 are operatively connected to potentiometers P1, P2, P4 and P3, respectively, for enabling desired adjustment of the potentiometers which corresponds to the preferred control and operation of feeder 105. Panel 137 is also provided with a plurality of holes corresponding to the positions of knobs 130 through 133 for enabling the adjustments corresponding to knobs 130 through 133. Front panel 137 is also provided with markings (e.g. 140 and 141) which enable the identification of knobs 130 through 133 and LED indicators 97 through 99. The back panel of control box 103 is provided with a plurality of holes for enabling the intrusion of leads 110 through 112 into the contained space within control box 103. Control box 103 is also provided with power cord 140 that is operatively connectable to an electric power supply for empowering the circuitry of control box 103. The back panel of control box 103 is also provided with a hole for enabling the intrusion of power cord 140 into the space contained by control box 103. Power cord 140 is operatively connected to posts 12 and 13 for enabling electrical communication between the power supply and the circuitry of control box 103, with post 13 being electrically grounded.

Thus, an operator of the present invention can adjust the control of feeder 105 by adjusting the knobs 130 through 133 of control box 103. General sensitivity control knob 130 and fine adjustment sensitivity knob 131 control the sensitivity of the circuitry to strikes by fish 104. During operation, the piezoelectric crystal of cartridge 101 transmits an electrical signal having a voltage amplitude proportional to the force produced by the fish strike. The positions of knobs 130 and 131 determine the threshold magnitude of the electrical signal from cartridge 101, which threshold must be surpassed for the circuitry to sense the strike. In this manner, knobs 130 and 131 can be adjusted to alleviate improper responses to vibrations which are not desired to actuate feeder 105. For each strike by fish 104 which surpasses the threshold magnitude, LED indicator 98 illuminates through hole 135 of control box 103.

Although the invention has been described in conjunction with the foregoing specific embodiment, many alternatives, variations, and modifications are apparent to those of ordinary skill in the art. Those alternatives, variations and modifications are intended to fall within the spirit and scope of the following claims.

What is claimed is:

1. A sensor for producing an electrical signal in response to mechanical stimuli produced by animals, comprising:
   a piezoelectric crystal; and
   a rigid conducting structure to which animals may impart a mechanical vibration, said rigid conducting structure being rigidly connected to said piezoelectric crystal for conducing said mechanical vibration from said animal to said piezoelectric crystal.

2. An apparatus for automatically dispensing food to animals, wherein the dispensation of food occurs when mechanically signaled for by the animals, comprising:
   a means for dispensing food to animals upon electrical actuation;
   a means for sensing mechanical stimuli produced by animals, said sensing means producing an electrical signal relative to the magnitude of said mechanical stimuli, wherein said sensing means comprises a piezoelectric crystal and a rigid conducting structure to which animals may impart a mechanical vibration, said rigid conducting structure being rigidly connected to said piezoelectric crystal for conducting said mechanical vibration from said animals to said piezoelectric crystal; and
   a means for controlling said dispensing means, said controlling means receiving said electrical signal and controlling said dispensing means in response to said electrical signal.

3. The apparatus of claim 2 wherein said rigid conducting structure comprises a rigid rod, said rigid rod being operatively connected to said piezoelectric crystal for deforming said piezoelectric crystal when said rigid rod is struck by a fish, thereby causing control of said dispensing means in response to said fish.

4. An apparatus for automatically dispensing food to animals, wherein the dispensation of food occurs when mechanically signaled for by the animals, comprising:
   means for dispensing food to animals upon electrical actuation;
   means for sensing mechanical stimuli produced by animals, said sensing means producing an electrical signal in response to said mechanical stimuli;
   means for detecting said electrical signal, said detecting means operatively transmitting said electrical signal to means for initiating the dispensation of food to the animals upon receipt of said electrical signal;
   means for terminating said dispensation of food after a duration of time; and
   means for disabling said initiating means for a second duration of time.

5. The apparatus of claim 4 wherein said disabling means comprises means for adjusting said second duration of time.

6. The apparatus of claim 4 wherein said disabling means comprises means for disabling said initiating means until a threshold number of mechanical stimulations are detected by said detecting means.

7. The apparatus of claim 6 wherein said disabling means further comprises means for adjusting said threshold number.

8. The apprtatus of claim 5 wherein said detecting means further comprises an amplifier having an adjustable gain which amplifies said electrical signal, wherein the output of said amplifier is transmitted to a comparator which stops further transmission said electrical signal unless the output of said amplifier has an amplitude exceeding a specified value.

9. The apparatus of claim 4 wherein said terminating means further comprises an adjustable timer which controls said first duration of time, thereby controlling the period of time for which food is dispensed.

10. An apparatus for controlling the dispensation of food from an electrically actuated food dispenser in response to signals from animals, comprising:
    means connectable to an electrically actuated food dispenser for initiating the dispension of food therefrom upon receipt of an electrical signal;
    means for detecting an electrical signal produced in response to signals from animals, said detecting means being operatively adapted for transmitting said electric signal to said initiating means;
    means for terminating said dispensation of food after a first duration of time; and
    means for disabling said initiating means for a second duration of time.

11. The apparatus of claim 10 wherein said second duration of time immediately follows said first duration of time.

12. The apparatus of claim 10 wherein said disabling means comprises means for adjusting said second duration of time.

13. The apparatus of claim 10 wherein said disabling means comprises means for disabling said initiating means until a threshold number of mechanical stimulations are detected by said detecting means.

14. The apparatus of claim 13 wherein said disabling means further comprises means for adjusting said threshold number.

15. The apparatus of claim 11 wherein said detecting means further comprises an amplifier having an adjustable gain which amplifies said electrical signal, wherein the output of said amplifier is transmitted to a comparator which stops further transmission of said electrical signal unless the output of said amplifier has an amplitude exceeding a specified value.

16. The apparatus of claim 10 wherein said terminating means further comprises an adjustable timer which control said first duration of time, thereby controlling the period of time for which food is dispensed.

* * * * *